(12) United States Patent
Nikkel et al.

(10) Patent No.: US 7,273,693 B2
(45) Date of Patent: Sep. 25, 2007

(54) METHOD FOR FORMING A PLANAR MIRROR USING A SACRIFICIAL OXIDE

(75) Inventors: Eric L. Nikkel, Philomath, OR (US); Michael G. Monroe, Corvallis, OR (US); Mickey Szepesi, Salem, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 337 days.

(21) Appl. No.: 10/909,074

(22) Filed: Jul. 30, 2004

(65) Prior Publication Data
US 2006/0024620 A1  Feb. 2, 2006

(51) Int. Cl.
*G02B 26/00* (2006.01)

(52) U.S. Cl. .................... 430/321; 430/319; 216/24

(58) Field of Classification Search .............. None
See application file for complete search history.

(56) References Cited

U.S. PATENT DOCUMENTS

2005/0162727 A1* 7/2005 Ishii et al. ............... 359/245

FOREIGN PATENT DOCUMENTS

WO    WO 02/12925    * 2/2006

\* cited by examiner

*Primary Examiner*—John A. McPherson (57) ABSTRACT

A micro electromechanical system (MEMS) mirror, comprising a displaceable hinged member, a mirror plate, and a plurality of mirror support elements. The mirror plate has a planar mirror face affixed thereto. The plurality of mirror support elements extend between the displaceable hinged member and the mirror plate.

8 Claims, 6 Drawing Sheets

METHOD FOR FORMING A PLANAR MIRROR USING A SACRIFICIAL OXIDE

BACKGROUND OF THE INVENTION

With a micro-mirror device, which is one type of micro electromechanical (MEMS) device, an actuator controllably displaces a mirror plate to reflect incident light in a controllable fashion. Micro-mirror devices can be used in a number of optical devices such as optical projectors, optical displays, and/or for optical communication devices. Multiple micro-mirror devices are arranged in an array in which each micro-mirror device provides one pixel for use in the display, or one bit for use in the communication device.

With many micro-mirror devices, the mirror plate attaches to the actuator at an attachment point. The surface of the mirror plate is distorted at the attachment point to allow for the attachment. Such distorted areas reflect light in unpredictable directions. As the dimensions of the mirror plate decreases, the corresponding percentage of the deformed mirror plate that is distorted to provide for an attachment point of similar size become unacceptably high. As such, many smaller mirror plates provide an unacceptably low planar surface percentage of the mirror plate for reliable reflection. Accordingly, it is desired to increase the percentage of each mirror plate that provides for true reflection.

DETAILED DESCRIPTION

In the following detailed description of the preferred embodiments, reference is made to the accompanying drawings that form a part thereof, and in which is shown by way of illustration specific embodiments in which the invention may be practiced. In this regard, directional terminology, such as "top", "bottom", "front", "back", "leading", "trailing", etc., is used with reference to the orientation of the figures being described. It is to be understood that other embodiments may be utilized and structural or logical changes may be made without departing from the scope of the present disclosure. The following detailed description, therefore, is not to be taken in a limiting sense, and the scope of the present disclosure is defined by the appended claims.

The present disclosure relates to a micro-mirror device (which is one type of a micro electromechanical (MEMS) device), and a technique for fabricating at least one micro-mirror device. Micro electromechanical (MEMS) systems or MEMS devices include micromachined substrates with electronic microcircuits integrated on the substrates. MEMS devices are formed on the substrates using micro-electronic techniques such as photolithography, vapor deposition, and etching.

The micro-mirror device includes a mirror plate that is configured to be planar across its entire reflective surface using the fabrication techniques as described herein. This disclosure thereby provides a technique by which the entire reflective surface of the micro-mirror device provides a reliable reflection of light in a desired direction.

One class of a MEMS device is a micro-mirror device as described in this disclosure. The micro-mirror device can controllably reflect light in a desired direction. In different embodiments, multiple micro-mirror devices are arranged in an array that is used as a display, a projector, or a communication device. As such, each micro-mirror device constitutes a light modulator for intensity modulation or phase modulation of incident light, and in one embodiment provides one cell or pixel of the projection array or display array. In addition, the micro-mirror device may also be used in other imaging systems such as projectors and may also be used for optical addressing.

Example Micro-Mirror Device

Figure 1:
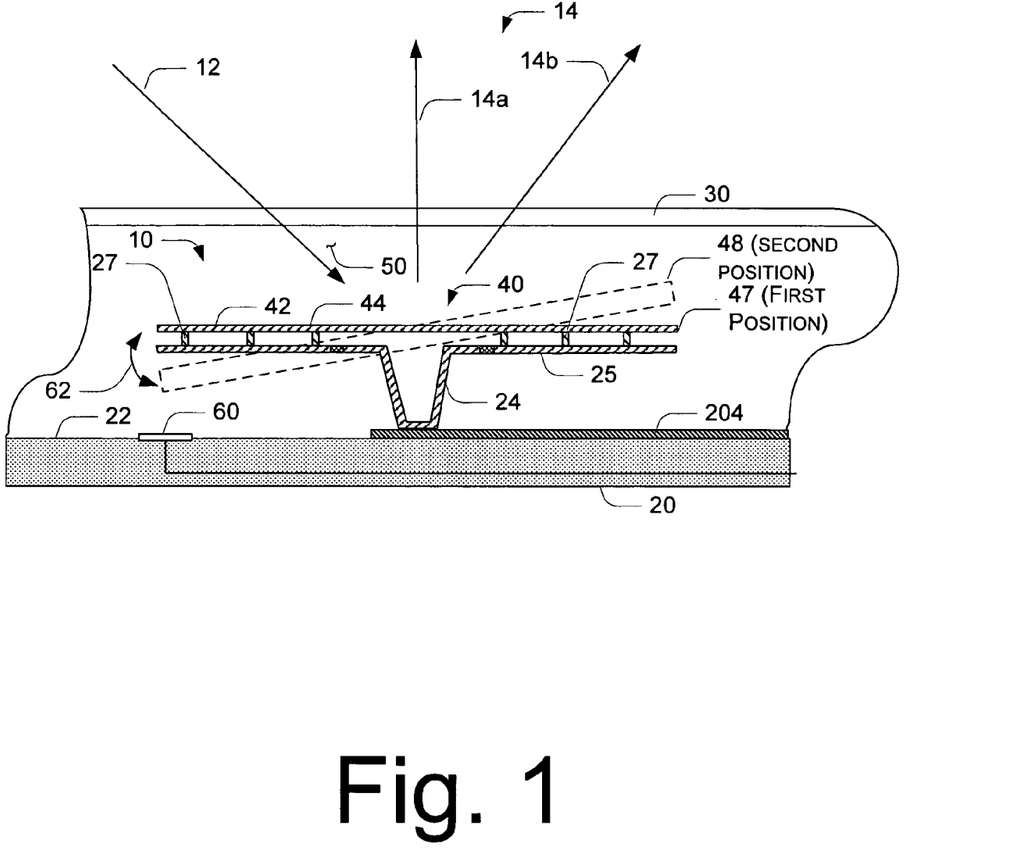
FIG. 1 is a schematic cross-sectional view illustrating one embodiment of a portion of a micro-mirror device.

With reference to FIG. 1, the micro-mirror device 10 is formed on a substrate 20 and lies underneath a coverplate 30. One embodiment of the micro-mirror device 10 comprises at least some of an actuator element 40, a support 24, a hinged member 25, the mirror plate 42, a plurality of mirror support elements 27, and an electrode 60. The actuator element 40 acts as a micro-actuator that utilizes electrical to mechanical conversion to generate a force and cause movement or actuation of the mirror plate 42 relying on the flexibility of the hinged member 25. The hinged member 25 is formed with one or more hinges (shown in checkered cross-section in FIG. 1) that allow the hinged member 25 to be displaced during actuation. In the illustrated and described embodiment, the mirror plate 42 is angularly displaceable from a first position 47 that is substantially parallel to a surface of the substrate 20 to a second position as a result of displacement of the hinged member 25. The coverplate 30 is positioned over the mirror plate(s) 42 of the micro-mirror devices 10 to provide protection thereto. A cavity 50 is formed between the coverplate 30 and the mirror plate 42 to provide sufficient space for the mirror plate 42 to be displaced into any of the positions 47 and 48 as described in this disclosure for actuation. The hinged member 25 is connected to the mirror plate 42 using a number of mirror support elements 27 that are configured in certain embodiments as vias that extend there between. The mirror support elements 27 support the mirror plate 42 relative to the hinged member 25 such that displacement of the mirror plate 42 is transferred to the hinged member 25.

In one embodiment, actuation of the actuator element 40 causes the mirror plate 42 to be displaced between a first position 47 and a second position 48 with respect to the substrate 20 as indicated by the arrow 62. As such, the mirror plate 42 in the first position 47 is illustrated as being substantially horizontal and substantially parallel to the substrate 20, while the mirror plate 42 in the second position 48 is illustrated in dotted lines as being oriented at an angle with respect to the first position 47 and the substrate. Any hinged member configuration that allows the motion 62 between the positions 47 and 48 of the mirror plate 42 is within the intended scope of the present disclosure.

In one embodiment, the electrode 60 interacts with the material of the mirror plate 42 to provide motive force that displaces mirror plate 42 relative to the substrate 20 between the first position 47 and the second position 48. In one embodiment, this relative displacement results when the electrode 60 applies an electromagnetic field to the mirror plate 42 that causes the mirror plate to be actuated or displaced. The mirror plate 42 is displaceably positioned by the hinged member 25 in a manner that allows displacement of the mirror plate 42 to be provided by hinges located within the hinged member 25. Any configuration of hinges that provides flexibility to the hinged member 25 is within the intended scope of the present disclosure. In different embodiments, the hinges can take the form of recesses formed in the hinged member 25, an insert of an additional flexible material within the hinged member, forming the hinged member at least partially from a relatively thin layer, or any other configuration that provides flexibility within the hinged member. The location of the hinge can be varied to any location within the hinged member 25 that allows the hinged member and the mirror plate 42 to flex or displace.

The hinged member 25 that is located in the actuator element 40 is illustrative in nature and not limiting in scope. A wide variety of configurations of the hinged members 25, the mirror plates 42, the mirror support elements 27, and the actuator element 40 that allow flexibility of the hinged member 25 as indicated in the micro-mirror device 10 are within the intended scope of the present disclosure. Such flexibility of the hinged member 25 allows for the relative displacement of the mirror plate 42 and the substrate 20. In one embodiment, the support 24 is configured as a via that provides a flexible mechanical connection and/or an electrical connection of the hinged member 25 with respect to the substrate 20. The support 24 therefore may be considered as securing the mirror plate 42 and the hinged member 25 within the actuator 40.

In the illustrated FIG. 1 embodiment, the mirror plate 42 is covered by and protected by the cover plate 30 such that light is free to be applied to the mirror plate 42 from above, and the applied light passes through the cover plate as shown by the arrow 12. The cover plate is spaced from the mirror plate 42 to allow a free range of motion of the mirror plate during actuation. Similarly, light reflecting from the mirror plate 42 is free to pass from below then through the cover plate 30 to above the cover plate as shown by arrows 14a and 14b that together are referenced as 14. A variety of suitable planar translucent or transparent materials such as quartz and plastic can be used for the cover plate 30.

The mirror plate 42 includes a reflective surface 44 that reflects light. In different embodiments, the mirror plate 42 is formed of a uniform or a coated material. The mirror plate 42 has a consistent reflectivity. When an array of mirror plates are provided, each one of the mirror plates (or a number thereof) can be individually deflected by its respective actuator. One embodiment of the reflective surface 44 includes a solid plate of an optically reflective metal, when polished, such as aluminum. In another embodiment, the mirror plate 42 is formed with a plate substrate, such as formed from polysilicon or another suitable material, that is coated with a reflective material such as aluminum or titanium nitride to form the reflective surface. The mirror plate 42 may either be formed from a non-conductive material or a conductive material.

As illustrated in the FIG. 1 embodiment, each micro-mirror device 10 modulates light generated by a light source (not shown) located on a side of a cover plate 30 that is opposite of the substrate 20. The light source may include, for example, ambient and/or artificial light. As such, input light 12 that is incident on the cover plate 30 passes through the cover plate 30 into the cavity 50 above the mirror plate 42, and is reflected by the reflective surface 44 of mirror plate 42 to provide output light 14. The output light 14 passes through the cavity 50 and the cover plate 30 to some final display or communication location such as towards a projection screen, directly towards a viewer or a detector.

The direction of the output light 14 that is reflected from the mirror plate 42 is a function of the position of the mirror plate. For example, with the mirror plate 42 in the second position 48, the output light 14 is directed in direction 14a. However, with the mirror plate 42 in the first position 47, the output light 14 is directed in direction 14b. Thus, the micro-mirror device 10 modulates or varies the direction of output light 14 generated by input light 12. As such, the mirror plate 42 can be used to steer light into, or away from, an optical imaging system.

In one embodiment where the micro-mirror device is used as a display or optical projector, the first position 47 is a neutral position of the mirror plate 42 and represents an "OFF" state of the micro-mirror device 10 in that light is reflected, for example, along 14b and away from a viewer or away from a display screen. The second position 48 of the mirror plate 42 is an actuated position that represents an "ON" state of micro-mirror device in that light is reflected, for example, to a viewer or onto a display screen. The selection of the ON state and the OFF state can be arbitrarily reversed by a display designer. In those embodiments that the micro-mirror device 10 is used as a communication device, the "ON" state can transmit a high level as a data element while the "OFF" state transmits a low level for that data element, or vice versa.

In one embodiment, the mirror plate 42 is displaced between the first position 47 and the second position 48 by applying an electrical signal to an electrode 60 formed on the substrate 20. In one embodiment, the electrode 60 is formed on a surface of the substrate 20 adjacent an end or edge of the mirror plate 42. The application of an electrical signal to the electrode 60 generates an electric field between the electrode 60 and the mirror plate 42, thereby causing movement of the mirror plate 42 between the first position 47 and the second position 48 as indicated by the arrow 62. In one embodiment, when the electrical signal is removed from the electrode 60, the mirror plate 42 persists or holds the second position 48 for a brief duration. Thereafter, the restoring forces of the hinge that is attached to the mirror plate 42 bias the mirror plate 42 to the first position 47 based on the action of the hinged member 25.

In the illustrated and described embodiment, the support 24 includes a conductor portion. In one embodiment, the entirety of the support 24 is formed of a conductive material. The conductive element 26 is electrically coupled to the mirror plate 42 and, more specifically, a conductive material of the mirror plate 42. As such, the mirror plate 42 is displaced between the first position 47 and the second position 48 by applying an electrical signal that can create a voltage differential between the electrode 60 and the mirror plate 42. More specifically in one embodiment, the electrode 60 is energized to one voltage level and the conductive material of the mirror plate 42 is energized to a second voltage level. In one embodiment, the application of an opposite voltage between the electrode 60 and the mirror plate 42 generates an attracting electric field between the electrode 60 and the mirror plate 42 which causes attractive movement of the mirror plate 42 between the first position 47 and the second position 48. The application of a different voltage between the electrode 60 and the mirror plate 42 generates a repulsing electric field between the electrode 60 and the mirror plate 42 that causes movement of the mirror plate 42 from the second position 48 to the first position 47 as indicated by the arrow 62.

In one embodiment, the electrical signal is applied to conductive material of the mirror plate 42 via the support 24. As such, the application of an electrical signal to the mirror plate 42 generates an electric field that causes displacement between the mirror plate 42 and the electrode 60 between the first position 47 and the second position 48.

This disclosure provides a number of embodiments of the mirror plate 42 such as shown in FIG. 1 in which the surface is maintained substantially planar across the entire surface than conventional devices which are formed with a via on the upper surface, thereby creating more area. This increase of the percentage of the area of the planar surface of the mirror plate 42 that is planar increases the percentage of the light which is applied to the mirror plate 42 that is reflected from the mirror plate 42, and thereby increases the reflective efficiency of each mirror plate. The percentage of the area of the upper surface of the mirror plate 42 that is planar is increased by forming the mirror plate as a distinct member from the hinged member 25; and by supporting the mirror plate 42 on the hinged member 25 by a set of mirror support elements 27 as described in the fabrication process shown in FIGS. 2a to 2h. The combination of the hinged member 25, the mirror support elements 27, and the mirror plate 42 for each micro-mirror device 10 is fabricated using, in one embodiment, a number of layers of a sacrificial oxide as described in the fabrication process shown in FIGS. 2a to 2h.

Example Micro-Mirror Device Fabrication

Figure 2A:
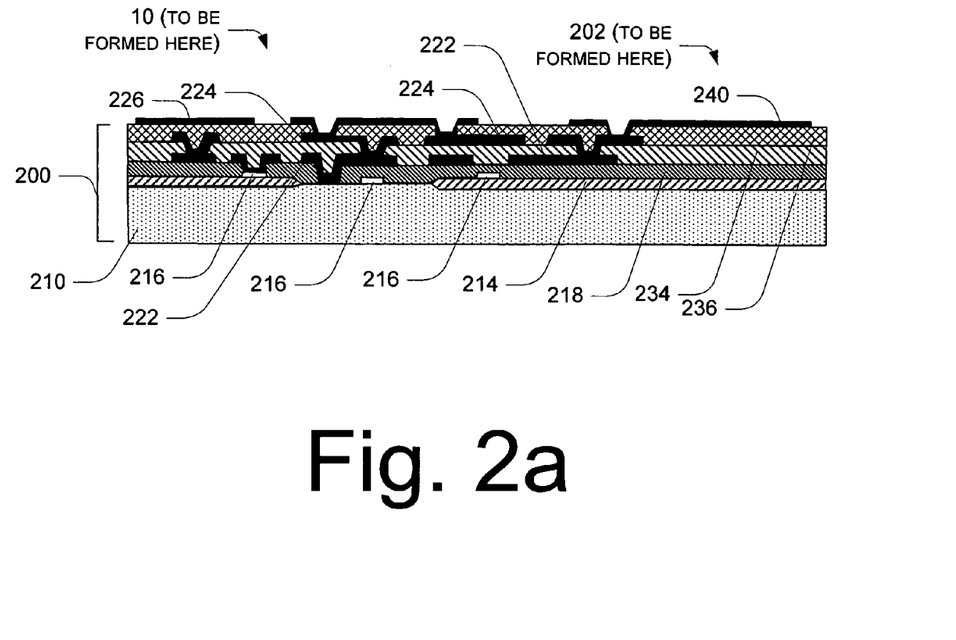
FIGS. 2a-2h illustrate one embodiment of a process that forms a micro-mirror device according to the present invention.

FIGS. 2a-2h illustrate one embodiment of an example of a fabrication process that produces the micro-mirror device 10 as shown in FIG. 1 in combination with an electrical contact area 202 at which electricity that is applied to a sub-structure 200. Electrical signals that are applied to the electrical contact area 202 can be selectively applied to the desired locations of the micro-mirror device 10 based on well understood integrated circuit layouts and operations. The fabrication process of FIGS. 2a-2h can involve simultaneous processing steps at the micro-mirror device 10 and the electrical contact area 202. The fabrication process starts with fabricating a sub-structure 200 as illustrated in FIG. 2a. In one embodiment, the sub-structure 200 includes a complementary metal oxide semi-conductor (CMOS) structure with a desired semiconductor and metal configuration. In an exemplary embodiment, the CMOS structure includes a multi-level metal CMOS circuit. The sub-structure 200 includes the substrate 210 and a plurality of conductive layers 222, 224, and 226 formed on a first side 212 of the substrate 210. FIG. 2a is a schematic representation of the sub-structure 200 and that an actual configuration of conductive layers 222, 224, and 226 and conductive elements formed between conductive layers may in certain embodiments be more complicated than is illustrated. The specific number and layout of the conductive layers 222, 224, and 226 is a design choice. In one embodiment, each one of the conductive layers 222, 224, and 226 are made with one or more of titanium (Ti), titanium nitride (TiN), copper (Cu), gold (Au), and/or aluminum (Al).

In one embodiment, the sub-structure 200 includes an oxide layer 214 and one of more gates 216. The gates 216 are formed of polysilicon. The plurality of gates 216 that can control the application of electrical signals within the conductive layers 222, 224, and 226 are formed over the substrate 210. The oxide layer 214 extends over a portion of the substrate 210 on which the electrical contact area 202 and the micro-mirror device 10 are to be fabricated. In one embodiment, the substrate 210 of the sub-structure 200 is formed of silicon, and the oxide layer 214 includes field oxide (FOX).

In one embodiment, the sub-structure 200 also includes a dielectric layer 218. The dielectric layer 218 is formed over at least a portion of the oxide layer 214. The conductive layer 222 is deposited at least partially over the dielectric layer 218. In addition, the conductive layers 224 and 226 of the sub-structure 200 are formed at least partially over respective dielectric layers 234 and 236 of the sub-structure 200. As such, each one of the conductive layers 222, 224, and 226 are vertically separated and electrically insulated from each other. In one embodiment, the dielectric layers 218, 234, and 236 include, for example, tetraethylorthosilicate (TEOS). The conductive layers 222, 224, and 226 are formed, for example, by deposition and patterning of metal such as by photolithography and etching as is generally understood in semiconductor processing.

In one embodiment, the conductive layer 222 selectively communicates with one or more gates 216 using conductive elements that extend through the dielectric layer 218. In addition, certain ones of the conductive layers 222, 224, and 226 can be configured to communicate with each other at certain locations by controllably activated conductive elements formed through the dielectric layers 234 and 236. Each electrical connection between the different portions of the conductive layers 222, 224, and 226 that provides the controllable electrical connection to the micro-mirror device 10 are not illustrated since FIGS. 2a to 2h represent a partial cross-sectional schematic diagram of the only a portion of the sub-structure 200, and not all of the vias and interconnects of the sub-structure are shown. In addition, some of the electrical connections are not permanent such that the electricity forming the electrical signals that are applied between the different regions within the distinct layers can be controlled as is well understood in the integrated circuit technology. Electricity is thereby supplied in a controllable manner to the different circuit locations between the conductive layers 222, 224, and 226 to the different devices that are fabricated on the sub-structure 200.

In one embodiment, the conductive material of the conductive layer 226 forms the active part of an electrical contact area 202 that at least partially defines an area where the electrical connection to the CMOS circuit of the micro-mirror device 10 is to be fabricated, as described below. In one embodiment, as illustrated in FIG. 2a, a portion of the conductive layer 226 is patterned to form an electrical contact pad 240 for the micro-mirror device 10. At least a portion of the electrical contact pad 240 is formed below where the electrical contact area 202 is to be fabricated in the sub-structure 200 as shown in FIGS. 2a to 2h. The embodiment of electrical contact area 202 as described in this disclosure can be fabricated in combination with the micro-mirror device 10 as described in this disclosure, and is illustrative in nature and not limiting in scope. Any other configuration of electrical contact area 202 that provides an electrical contact to the conductive layers 222, 224, and 226 is within the intended scope of the present disclosure.

Figure 2B:
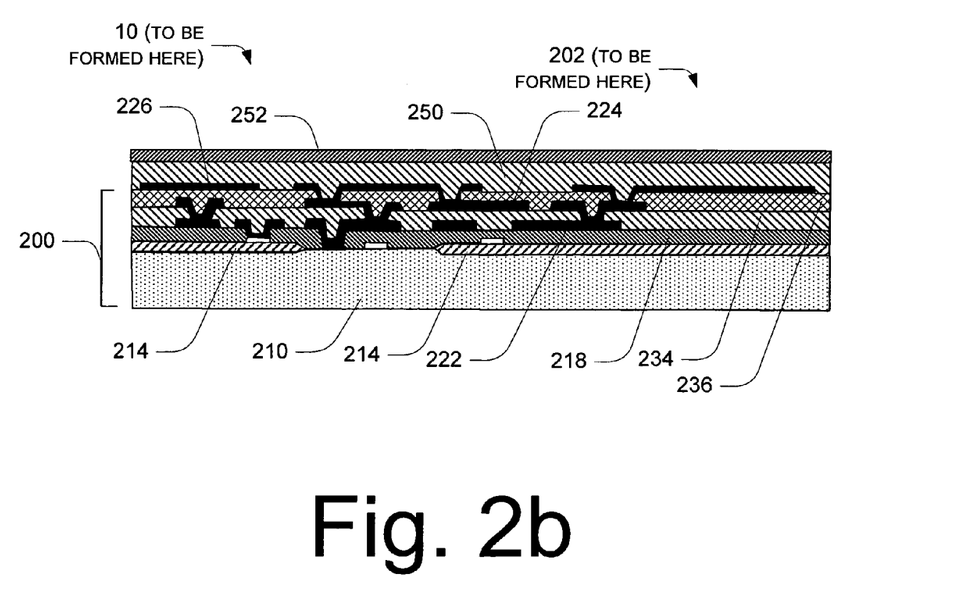

As illustrated in FIG. 2b, a dielectric layer 250 is deposited over the conductive layer 226 of the sub-structure 200, and the dielectric material is planarized to create a substantially flat surface. In one embodiment, the dielectric material is planarized by a chemical mechanical polishing (CMP) process. In one embodiment, the target thickness of the dielectric layer 250 is 5000 A to 7000 A, though other thicknesses are within the intended scope of the present disclosure.

A protective layer 252 is deposited over the dielectric layer 250. In one embodiment, the dielectric layer 250 is formed by depositing a dielectric material over the conductive layer 226 by chemical vapor deposition (CVD) such as plasma enhanced CVD (PECVD). In one embodiment, the dielectric layer 250 includes the TEOS and the protective layer 252 formed of a material that is resistant to etchant used for subsequent processing in forming the micro-mirror device 10.

The dielectric material of the protective layer 252 is deposited, for example, by chemical vapor deposition (CVD). In one embodiment, the protective layer 252 includes, for example, 3000 A of silicon carbide (SiC), though other thicknesses and materials are within the intended scope of the present disclosure. In one embodiment the sub-structure 200, the dielectric layer 250 and the protective layer 252 form the sub-structure 200 that supports the completed micro-mirror device 10 as shown in FIGS. 1 and 2h. As such, the protective layer 252 forms a portion of the exposed surface on the substrate 20 that at least partially remains even following the processing as described with respect to FIG. 2h.

Figure 2C:
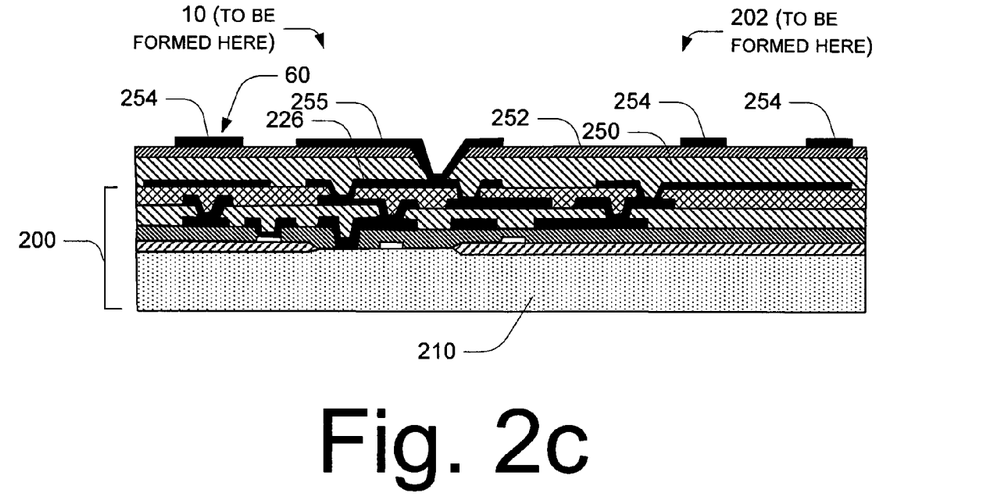

As illustrated in FIG. 2c, a conductive path 255 such as a metal is deposited on at least a portion of the protective layer 252. At least a portion of the metal forming the conductive path 255 is deposited, patterned, and etched to define the actuator element 40 and the electrical contact area 202 on the protective layer 252. In one embodiment, the conductive path 255 includes a material which is resistant to the etchant used for subsequent processing in forming the micro-mirror device 10, as described below. In one embodiment, the conductive path 255 includes, for example, titanium nitride (TiN).

In one embodiment as described with respect to FIG. 1, a via that is used to form the outer shape of the support 24 is formed through the protective layer 252 and the dielectric layer 250 down to be in electrical contact with the conductive layer 226 using, for example, a fluorine etch. In one embodiment, the conductive path 255 is patterned to define the electrode 60 by outlining the electrical contact area on the protective layer 252. More specifically, the conductive path 255 is patterned to outline where the support 24 as described with respect to FIG. 1 has to electrically contact following the subsequent processing. The conductive path 255 is electrically connected at various locations of the conductive layer 226 of the sub-structure 200. As such, the conductive path 255 is controllably connected to be electricity applied to the electrical contact pad 240. The conductive path 255 is also electrically coupled directly to the micro-mirror device 10. In one embodiment, the conductive material of the conductive path 255 is Titanium Nitride (TiN) with a coating material such as SiC or Si that is impervious to buffered oxide etch (BOE) etching.

Figure 2D:
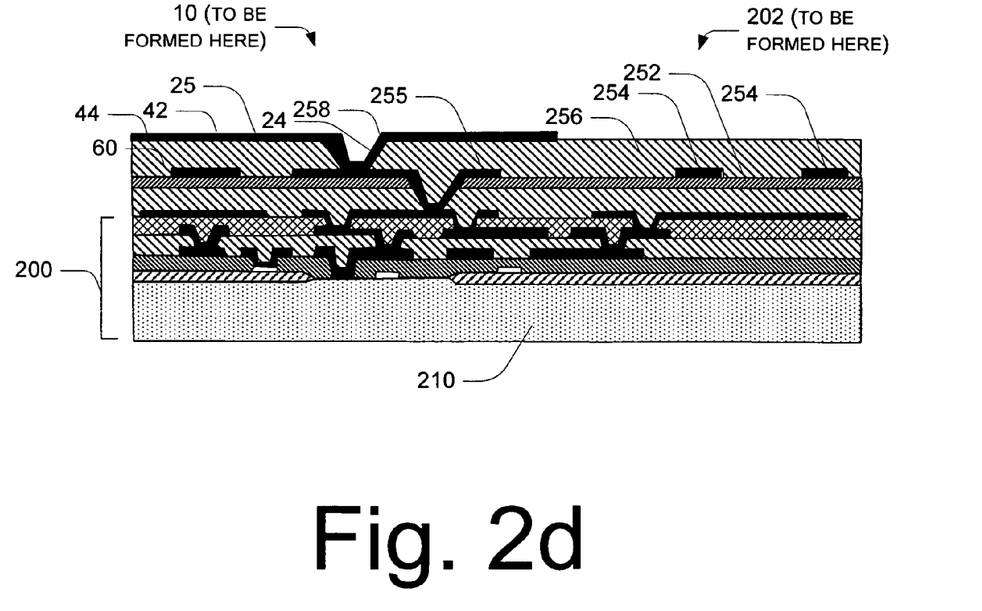

In FIG. 2d, the material that is used to form the support 24 and the hinged member 25 as described with respect to FIG. 1 is formed in electrical contact with the conductive path 255. In one embodiment, the hinged member 25 is physically attached by deposition to the support 24. Based on this deposition, at least a portion of the hinged member 25 partially forms the conductive path 255. To form one embodiment of the hinged member 25, a sacrificial oxide layer 256 is deposited upon at least a portion of the conductive path 255 that overlies the protective layer 252. The sacrificial oxide layer 256 is used to form the shape of a portion of the micro-mirror device 10 as described with respect to FIG. 1 (and also the electrical contact area 202). The sacrificial oxide layer 256 is at least partially formed upon the protective layer 252. Within this disclosure, each sacrificial oxide layer such as the sacrificial oxide layer 256 is referred to as "sacrificial" in that its material is substantially removed during subsequent processing to release the formed device such as the micro-mirror device 10, as described below. In this disclosure, there are a number of sacrificial oxide layers that are used to form and relatively position the hinged member 25, the mirror plate 42, the mirror support elements 27, and the support 24 as shown in FIG. 1.

In one embodiment, the material of the sacrificial oxide layer 256 includes a dielectric material that is silicon-based such as such as silicon oxide. The dielectric material of the sacrificial oxide layer 256 is deposited, for example, by CVD or PECVD deposition techniques and includes, for example, tetraethylorthosilicate (TEOS). In one embodiment, the sacrificial oxide layer 256 includes silicon (Si). The dielectric material of the sacrificial oxide layer 256 may also include, for example, a phosphorous or boron doped oxide. After the material of the sacrificial oxide layer 256 is deposited over the conductive path 255 and the protective layer 252, the material of the sacrificial oxide layer 256 is planarized such as by CMP to create a substantially flat surface on which the hinged member 25 can be formed. After the sacrificial oxide layer 256 is planarized, the hinged member 25 is formed on the sacrificial oxide layer 256 above the support 24 as portion of the actuator 40 in FIG. 1. In one embodiment, the process results in the formation of a via in which the support 24 is formed. through the sacrificial oxide layer 256 using, e.g., a fluorine plasma etch, that etches down to the conductive path 255 that allows the formed hinged member 25 to be in electrical communication with the conductive path 255. The hinged member 25 includes the support member 24 that conforms to the via formed in the sacrificial oxide layer, and thereby would provide a surface irregularity to the mirror plate 42 which is desired to be substantially planar.

Further processing as described with respect to FIGS. 2e to 2h allows for the mirror plate 42 and the associated structure to be formed. The processing described herein improves the planar configuration of the mirror plate. The reflective surface 44 of the mirror plate 42 is formed by silver (Ag), chromium (Cr), or another suitable reflective material.

Figure 2E:
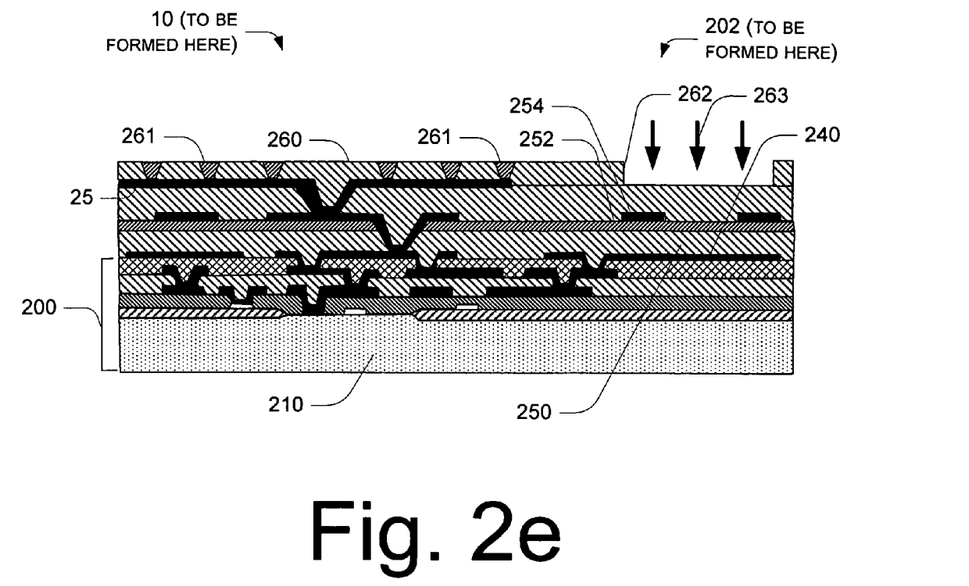

As illustrated in FIG. 2e, another sacrificial oxide layer 260 that is formed from a sacrificial oxide material is deposited over the substrate that forms in the general vicinity of the hinged member 25 as well as the vicinity of the electric contact area 202. The sacrificial oxide layer 260 performs two distinct uses in these two areas 25 and 202 based on the associated processing as now described in order.

In one embodiment, the deposition of the sacrificial oxide layer 260 over the hinged member 25 acts to define the outline of a horizontally extending void between the hinged member 25 and the mirror plate 42. In addition, vias 261 are formed in the sacrificial oxide layer 160 that allow formation of the outlines of the mirror support elements 27 as described with respect to FIG. 1. In one embodiment, the sacrificial oxide layer 260 can be deposited, used, and have a similar material are described with respect to the sacrificial oxide layer 256 that is described with respect to FIG. 2d.

A plurality of vias 261 are formed using photoresist and etching techniques in the sacrificial oxide layer that provide the outline of the mirror support element 27 as described with respect to FIG. 1. The vias 261 are formed in the sacrificial oxide layer 260 using such etching techniques as fluorine plasma etching, and the etching stops on the hinged member 25. The number and dimensions of the plurality of vias 260 are selected so that when the vias 260 are metallized to form the mirror support elements 27 and the sacrificial oxide layer 260 is removed, then the remaining mirror support elements 27 will be structurally able to support the mirror plate 42 above the hinged member 25 as described with respect to FIG. 1.

The processing of the sacrificial oxide layer 260 in the general vicinity of the electric contact area 202 following the deposition of the sacrificial oxide layer is now described also with respect to FIG. 2e. In one embodiment, the sacrificial oxide layer 260 is patterned by photolithography as indicated by the arrows 263 that are directed at the electrical contact area 202 to expose an area of the sacrificial oxide layer 256 above the electric contact pad 240. As such, the sacrificial oxide layer 260 defines those regions in the electrical contact area 202 of the sub-structure 200 that are to be etched to form the opening 242 (that is formed as shown in FIG. 2f) to the electrical contact pad 240.

In the illustrated and described embodiment, the opening 242 of the electrical contact area 202 is formed by chemical etching. Thus, the sacrificial oxide layer 260 is formed of a material which is resistant to etchant that is used for etching the opening 242. Examples of a material suitable for the sacrificial oxide layer 260 include silicon dioxide, silicon nitride, or photoresist. In one embodiment, the etch process is a dry etch, such as a plasma based fluorinated etch using, for example, $SF_6$, $CF_4$, or $C_2F_6$.

In one embodiment, as illustrated in FIGS. 2e, the sacrificial oxide layer 260 includes a mask opening 262 through which the opening 242 (FIG. 2f) of electrical contact area 202 is etched. In one embodiment, the mask opening 262 is smaller than an outer boundary and larger than an inner boundary of the conductive path 255 provided in electrical contact area 202 of sub-structure 200 and on the protective layer 252. Thus, etching of the opening 242 to the electrical contact pad 240 is controlled by the conductive path 255, as described below.

Figure 2F:
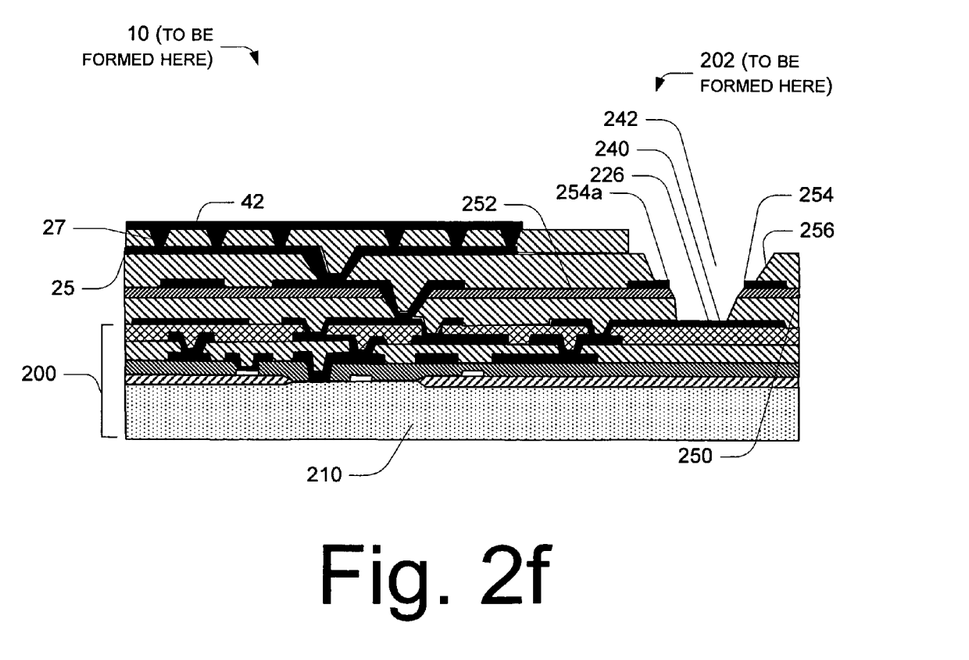

In FIG. 2f, a mirror layer 272 is deposited over the sacrificial silicon layer in the area of the micro-mirror device 10. The mirror layer 272 is patterned in the left side of FIG. 2f that corresponds to the fabrication area for the micro-mirror device 10 as described with respect to FIG. 1. The deposition of the mirror layer 272 forms the support elements 27 within the vias 261 as well as the mirror plate 42 on the upper surface of the sacrificial oxide 260 as shown in FIG. 2e.

The mirror layer 272 is used to fabricate the metal plate 42 and the support elements 272 using a variety of fabrication techniques. In one embodiment, the bulk of the mirror layer 272 forming the mirror plate 42 is formed from plasma silicon, that is planarized to form a smooth upper surface. The depth of the layer forming the mirror plate is to be sufficiently thick prior to planarization such that layer completely fills the vias 261 as described with respect to FIG. 2e. The upper surface can then be coated with a mirror surface material such as reflective metal layer. In one embodiment, a reflective material may be adhered to form the surface of the mirror plate 42. The deposited mirror layer is conformal to the shape of the mirror plate, including in certain embodiments a deposited and shaped plug formed from the material deposited to form the vias 261. The mirror layer 272 undergoes etching by sputter etching or wet etch. Chlorine or flourine plasmas can be used for this etching of the mirror layer. The mirror provide a more consistent reflection of the light applied to the mirror plate. Following the formation and etching of the mirror layer 272, the mirror plate is in its finished state since it has the desired light-reflective characteristics. The subsequent fabrication processes shown in FIGS. 2g and 2h free the mirror plate 42 from the sacrificial oxide layer 256.

Also shown in FIG. 2f, the opening 242 is formed through the sacrificial oxide layer 256, through the protective layer 252 within the boundary defined by the conductive path 254, and through dielectric layer 250 to the conductive layer 226 of sub-structure 200. The electrical contact pad 240 of the micro-mirror device 10, therefore, is exposed.

As described above, the opening 242 is formed by etching. During etching of the opening 242, the conductive path 254 that is provided in electrical contact area 202 acts as an etch stop. More specifically, the conductive path 254 masks a portion of the protective layer 252 and selectively controls or blocks etching of the protective layer 252 and the dielectric layer 250. As such, the conductive path 254 of electrical contact area 202 limits etching to within an area that approximately coincides with, and is appropriate to expose, the electrical contact pad 240. A portion 254a of the conductive path 254 is exposed since the mask opening 262 is smaller than an outer boundary and larger than an inner boundary of the conductive path 254 provided in electrical contact area 202. As such, this exposed portion 254a of the conductive path 254 defines a perimeter of the opening 242.

Figure 2G:
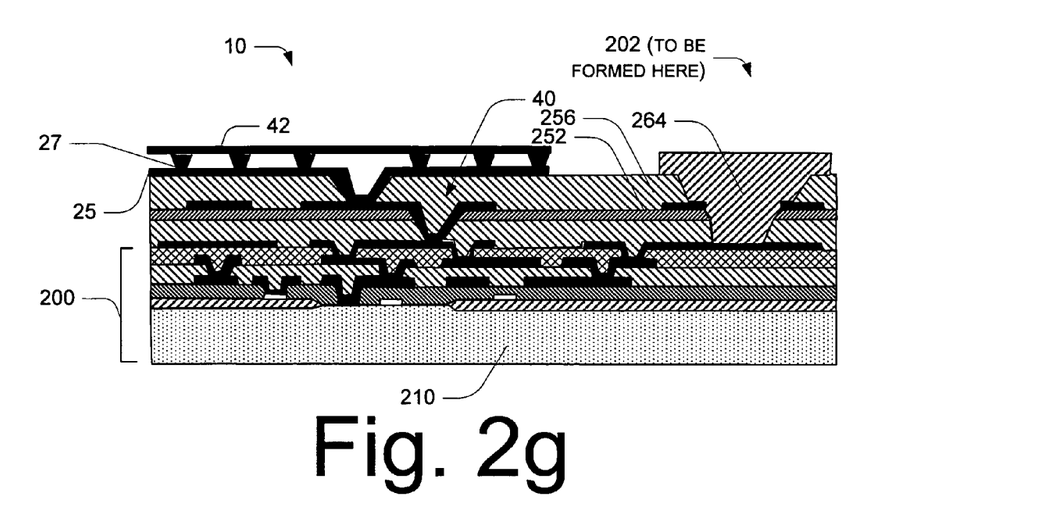
Figure 2H:
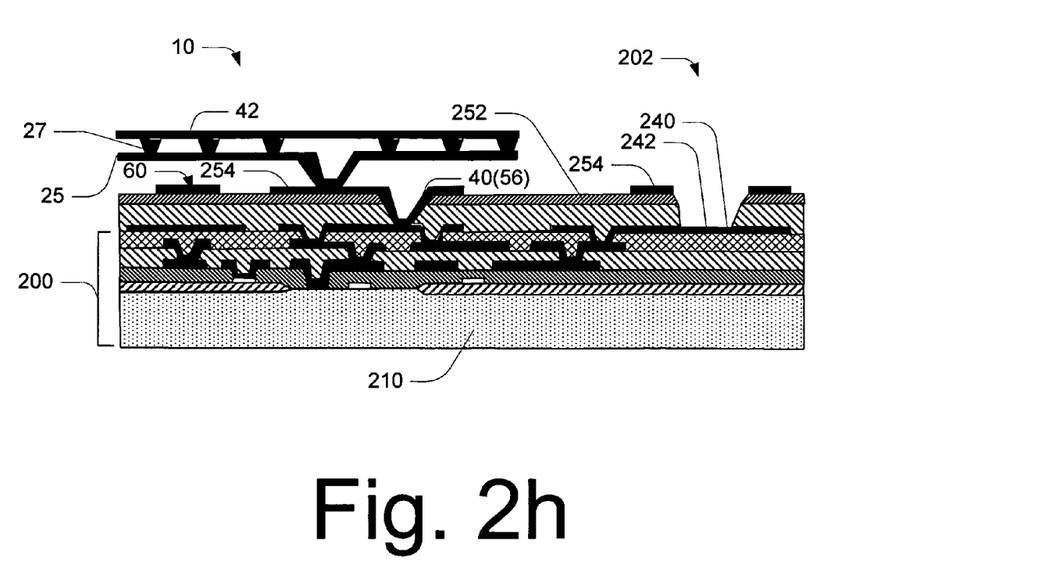

After the opening 242 is formed, the sacrificial oxide layer 260 as shown in FIG. 2g is stripped or removed. As such, the mirror plate 42 and the sacrificial oxide layer 256 are revealed or exposed. In one embodiment, when the sacrificial oxide layer 260 is formed of an oxide, the sacrificial oxide layer 260 is removed, for example, by a chemical etch. In another embodiment, when the sacrificial oxide layer 260 is formed of photoresist, the sacrificial oxide layer 260 is removed, for example, by a resist stripper.

Next, as illustrated in the embodiment of FIG. 2g, the opening 242 of the electrical contact area 202 is temporarily filled or plugged to protect the electrical contact pad 240, as exposed through the opening 242, during subsequent processing. In one embodiment, the opening 242 is temporarily filled with a protective material 264 which is resistant to etchant used for subsequent processing in forming the micro-mirror device 10, as described below. In one embodiment, the protective material 264 includes, for example, photoresist.

As illustrated in the embodiment of FIG. 2h, the material of the sacrificial oxide layer 256 is substantially removed from between the mirror plate 42 and the protective layer 252. Thus, the mirror plate 42 is released and the conductive path 255, including the electrode 60, is exposed. In certain embodiment, the dielectric layer 250 is also removed to provide increased flexibility to the hinged member 25 of the actuator 40.

In one embodiment, the sacrificial oxide layer 256 is removed by a chemical etch process. As such, the protective layer 252, the conductive path 255, and the protective material 264 are each selected so as to be resistant to the particular etchant used for removing the sacrificial oxide layer 256. In one embodiment, the etch process for removing the sacrificial oxide layer 256 is a wet etch, such as a buffered oxide etch (BOE).

In one embodiment, with exposed portion 254a of the conductive path 254 defining a perimeter of the opening 242, as described above with reference to FIG. 2f, additional margin against etchant penetration into the opening 242 and to the electrical contact pad 240 is realized. More specifically, the protective material 264 and the exposed portion 254a of the conductive path 254 form a lateral interface around the perimeter of the opening 242 which is resistant to the particular etchant used for removing the sacrificial oxide layer 256. A length of this interface can be sized to provide sufficient margin against etchant penetration into the opening 242 depending on a rate of interface failure during etching.

After the sacrificial oxide layer 256 is substantially removed, the protective material 264 that is used to fill or plug the opening 242 is removed. As such, the electrical contact pad 240 of the micro-mirror device 10 is exposed. In one embodiment, when the protective material 264 includes photoresist, the protective material 264 is removed, for example, by a resist stripper or solvent such as isopropyl alcohol or acetone.

While the above description refers to the formation of a micro-mirror device, it is understood that the above process is also applicable to the formation of other MEMS devices, including multi-layer MEMS devices. In addition, it is understood that FIGS. 2a-2h are schematic illustrations of one embodiment of forming a micro-mirror device according to the present invention and that the actual configuration of layers and vias of the micro-mirror device may differ from those illustrated.

Figure 3:
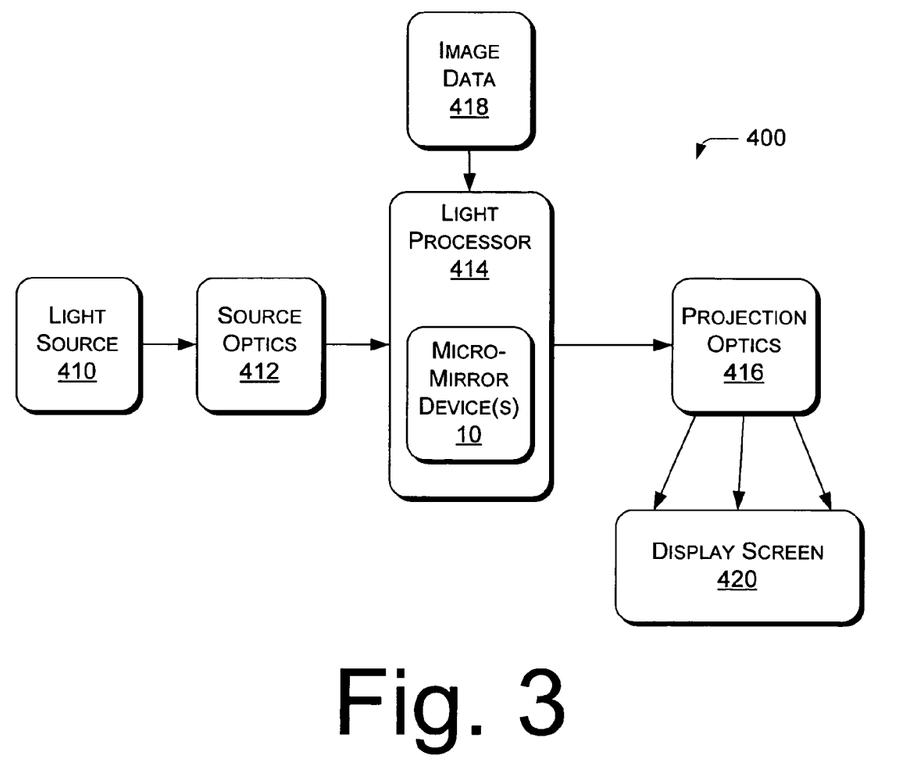
FIG. 3 is a block diagram illustrating one embodiment of a display system including a micro-mirror device according to the present invention.

In one embodiment, as illustrated in FIG. 3, the micro-mirror device 10 as described with respect to FIGS. 1 and 2a to 2h is incorporated in a display system 400. The display system 400 includes a light source 410, a source optics 412, a light processor or controller 414, and projection optics 416. The light processor 414 includes multiple micro-mirror devices 10 that are arranged in an array such that each micro-mirror device 10 constitutes one cell or pixel of the display. It is envisioned that in certain embodiments, that the light processor 414 includes a plurality of micro-mirror devices that are arranged in an array.

In one embodiment, the light processor 414 receives image data 418 representing an image to be displayed. As such, the light processor 414 controls the actuation of the micro-mirror devices 10 and the modulation of light received from the light source 410 based on the image data 418. The modulated light is then projected to a viewer or onto a display screen 420.

Although specific embodiments have been illustrated and described herein for purposes of description of one embodiment, it will be appreciated by those of ordinary skill in the art that a wide variety of alternate and/or equivalent implementations calculated to achieve the same purposes may be substituted for the specific embodiments shown and described without departing from the scope of the present invention. This application is intended to cover any adaptations or variations of the embodiments discussed herein. Therefore, it is manifestly intended that this invention be limited only by the claims and the equivalents thereof.

The invention claimed is:

1. A method for making a micro mirror device, the method comprising:
    forming a mirror actuator;
    depositing a first sacrificial oxide layer above the mirror actuator;
    depositing a hinged member at least partially on the first sacrificial oxide layer, wherein the hinged member comprises:
        one or more hinges configured to allow the hinged member to be displaced during actuation; and
        a rigid portion distal to the one or more hinges not subject to deformation during actuation;
    depositing a second sacrificial oxide layer at least partially above the hinged member;
    forming voids in the second sacrificial oxide layer, the voids extend from the hinged member to an upper surface of the second sacrificial oxide layer;
    forming metal vias in the voids that extend from the hinged member to the upper surface of the second sacrificial oxide layer, wherein the metal vias connect to the rigid portion of the hinged member distal to the one or more hinges;
    forming a mirror plate on the upper surface of the sacrificial layer, to secure the mirror plate to the metal vias, thereby establishing a connection between the mirror plate and the rigid portion of the hinged member, wherein the connection is configured to require the rigid portion and the mirror plate to move in a parallel relationship during actuation that resists deformation of the mirror plate; and
    removing the first sacrificial oxide layer and the second sacrificial oxide layer to leave behind the micro mirror device formed including the hinged member, the metal vias, and the mirror plate.

2. The method of claim 1, further comprising planarizing the surface of the mirror plate.

3. The method of claim 1, further comprising depositing a substantially planar mirror face layer on the mirror plate.

4. The method of claim 1, further comprising forming a hinge in the hinged member.

5. The method of claim 1, wherein the second sacrificial oxide layer includes a silicon oxide.

6. The method of claim 1, wherein the metal via includes a plug, and wherein a portion of the plug forms a planar surface that is substantially planar with the mirror plate, and wherein this substantially planar surface provides for the maintaining the mirror plate in its substantially planar configuration.

7. The method of claim 1, further comprising forming an integrated circuit portion, and further comprising forming the micro mirror device above the integrated circuit portion.

8. A method for making a micro mirror device, the method comprising:
    forming a hinged member, wherein the hinged member comprises:
        one or more hinges configured to allow the hinged member to be displaced during actuation; and
        a rigid portion distal to the one or more hinges not subject to deformation during actuation;
    depositing a sacrificial oxide layer at least partially above the hinged member;
    forming voids in the sacrificial oxide layer, the voids extend from the hinged member to an upper surface of the sacrificial oxide layer;
    forming metal vias in the voids that extend from the hinged member to the upper surface of the sacrificial oxide layer, wherein the metal vias connect to the rigid portion of the hinged member distal to the one or more hinges;
    forming a mirror plate on the upper surface of the sacrificial layer that are secured to the metal vias, thereby establishing a connection between the mirror plate and the rigid portion of the hinged member that allows the rigid portion and the mirror plate to move during actuation in a parallel relationship that resists deformation of the mirror plate; and
    removing the sacrificial oxide layer to leave behind the micro mirror device formed including the hinged member, the metal vias, and the mirror plate.

\* \* \* \* \*